(12) United States Patent
Zhang et al.

(10) Patent No.: US 6,687,748 B1
(45) Date of Patent: Feb. 3, 2004

(54) NETWORK MANAGEMENT SYSTEM AND METHOD OF OPERATION

(75) Inventors: Hang Zhang, San Jose, CA (US); Avinash J. Marathe, Santa Clara, CA (US); Duc M. Pham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/477,150

(22) Filed: Jan. 4, 2000

(51) Int. Cl.[7] ............................................. G06F 15/173
(52) U.S. Cl. .................... 709/223; 709/224; 709/245
(58) Field of Search ........................ 709/223, 224, 709/245, 230, 225; 714/28, 32, 33; 703/13

(56) References Cited

U.S. PATENT DOCUMENTS

| | | | |
|---|---|---|---|
| 5,210,530 A | 5/1993 | Kammerer et al. .... | 340/825.08 |
| 5,621,721 A | 4/1997 | Vatuone ................ | 370/16 |
| 5,678,006 A | 10/1997 | Valizadeh et al. ..... | 395/200.02 |
| 5,894,566 A * | 4/1999 | Croslin ................. | 703/21 |
| 5,907,696 A * | 5/1999 | Stilwell et al. ........ | 703/13 |
| 6,108,309 A * | 8/2000 | Cohoe et al. ......... | 370/241 |
| 6,266,335 B1 * | 7/2001 | Bhaskaran ............ | 370/399 |
| 6,430,617 B1 * | 8/2002 | Britt et al. ........... | 709/224 |
| 6,510,159 B1 * | 1/2003 | Noriyuki .............. | 370/401 |

OTHER PUBLICATIONS

Chung, et al., "Simulating Concurrent Intrusions for Testing Intrusion Detection Systems: Parallelizing Intrusions," *Department of Computer Science, University of California,* Date Unknown, 11 pages.

* cited by examiner

*Primary Examiner*—Zarni Maung
(74) *Attorney, Agent, or Firm*—Baker Botts L.L.P.

(57) ABSTRACT

A network management server manages multiple network devices coupled to a communication network. A simulation device coupled to the communication network uses virtual network addresses to simulate multiple network devices in two respects. First, the simulation device uses virtual network addresses to simulate the generation of alarm signals from multiple network devices in the network environment. Second, the simulation device uses virtual network addresses to simulate responses to polling requests issued by the network management server. In this respect, the simulation device simulates the operation of multiple network devices to test the scaleability, performance, and reliability of the network management server.

31 Claims, 3 Drawing Sheets

| ALARM TYPE | ALARM DATA |
|---|---|
| TEMPERATURE | 70° |
| INTERFACE ON/OFF | INTERFACE NAME |
| POWER LOSS | POWER SUPPLY ID, REMAINING BACKUP POWER |

FIG. 2B

| VIRTUAL ADDRESS | DEVICE TYPE |
|---|---|
| 128.111.36.1 | ROUTER |
| ⋮ | ⋮ |
| 128.111.37.1 | PRINTER |
| ⋮ | ⋮ |
| 128.111.37.255 | ROUTER |

FIG. 2C

| USER NAME | USER PASSWORD | ACCESS DEVICE | NETWORK ADDRESS |
|---|---|---|---|
| BOB | PASSWORD | MODEM 5 | 128.111.37.1 |
| JOHN | HAPPY | MODEM 2 | 128.111.37.2 |
| FRANK | SILLY | MODEM 9 | 128.111.37.8 |

NETWORK MANAGEMENT SYSTEM AND METHOD OF OPERATION

TECHNICAL FIELD OF THE INVENTION

This invention relates in general to data communication, and more particularly to a network management system.

BACKGROUND OF THE INVENTION

Computer networks have grown increasingly complex as businesses have come to rely on large numbers of computers coupled to the networks to conduct business. The computer networks are responsible for transporting information between the computers used in the business as well as allowing users to connect to their work from remote locations.

To manage all of the information and equipment that is supported by the network requires a significant time investment. Network management systems have been developed to assist in managing computer networks. Network management systems often need to support large networks and be capable of scaling up from managing a few devices on a network to a few thousand or more devices on a network while maintaining consistent performance and reliability. Typically, network management systems are tested for scaleability, performance, and reliability both before and after deployment.

Prior to deployment, testing of a network management system is generally performed in a lab environment. One problem with this approach is the prohibitive costs associated with maintaining a large network environment of network devices for testing the capabilities of the network management systems. Alternately, a network management system may be tested using a more manageable number of devices in the network environment. A drawback to this approach is that traditional network management systems are configured to ignore multiple alarm signals of a particular type form a single source. Therefore, traditional network management systems are limited to testing only those devices physically present in the laboratory network environment. As a result, network management systems may be tested using fewer network devices than are present in the network environments in which the network management systems are expected to perform. In this respect, traditional network management systems may not be properly tested for scaleability, performance, and reliability.

SUMMARY OF THE INVENTION

In accordance with the present invention, the disadvantages and problems associated with prior network management systems have been substantially reduced or eliminated.

In accordance with one embodiment of the present invention, a network management system includes a network management server coupled to a communication network and a simulation device coupled to the communication network. The simulation device has a physical network address and is operable to communicate an alarm signal to the network management server. The alarm signal is associated with a virtual network address that is distinct from the physical network address.

Another embodiment of the present invention is a method for communicating alarm signals that includes storing a physical network address associated with a simulation device and storing a plurality of virtual network addresses. The method further includes communicating an alarm signal to a network management server. The alarm signal is associated with a virtual network address that is distinct from the physical network address.

Technical advantages of the present invention include a system that simulates the operation of multiple network devices using a single physical network device for testing of a network management server. In particular, whereas prior testing systems require maintaining many network devices for testing network management servers in a large network environment, the present invention includes a simulation device that uses virtual network addresses to simulate the operation of multiple network devices in the network environment. The present invention uses virtual network addresses to simulate multiple network devices in two respects. First, a simulation device uses virtual network addresses to simulate the generation of alarm signals from multiple network devices in the network environment. Second, the simulation device uses virtual network addresses to simulate responses to polling requests issued by the network management server. In this respect, the present invention decreases the monetary and time burdens of purchasing and maintaining many network devices in a network environment while still accurately testing the scaleability, performance, and reliability of network management servers.

Other technical advantages are readily apparent to one skilled in the art from the following figures, descriptions and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein.

DETAILED DESCRIPTION OF THE INVENTION

Figure 1:
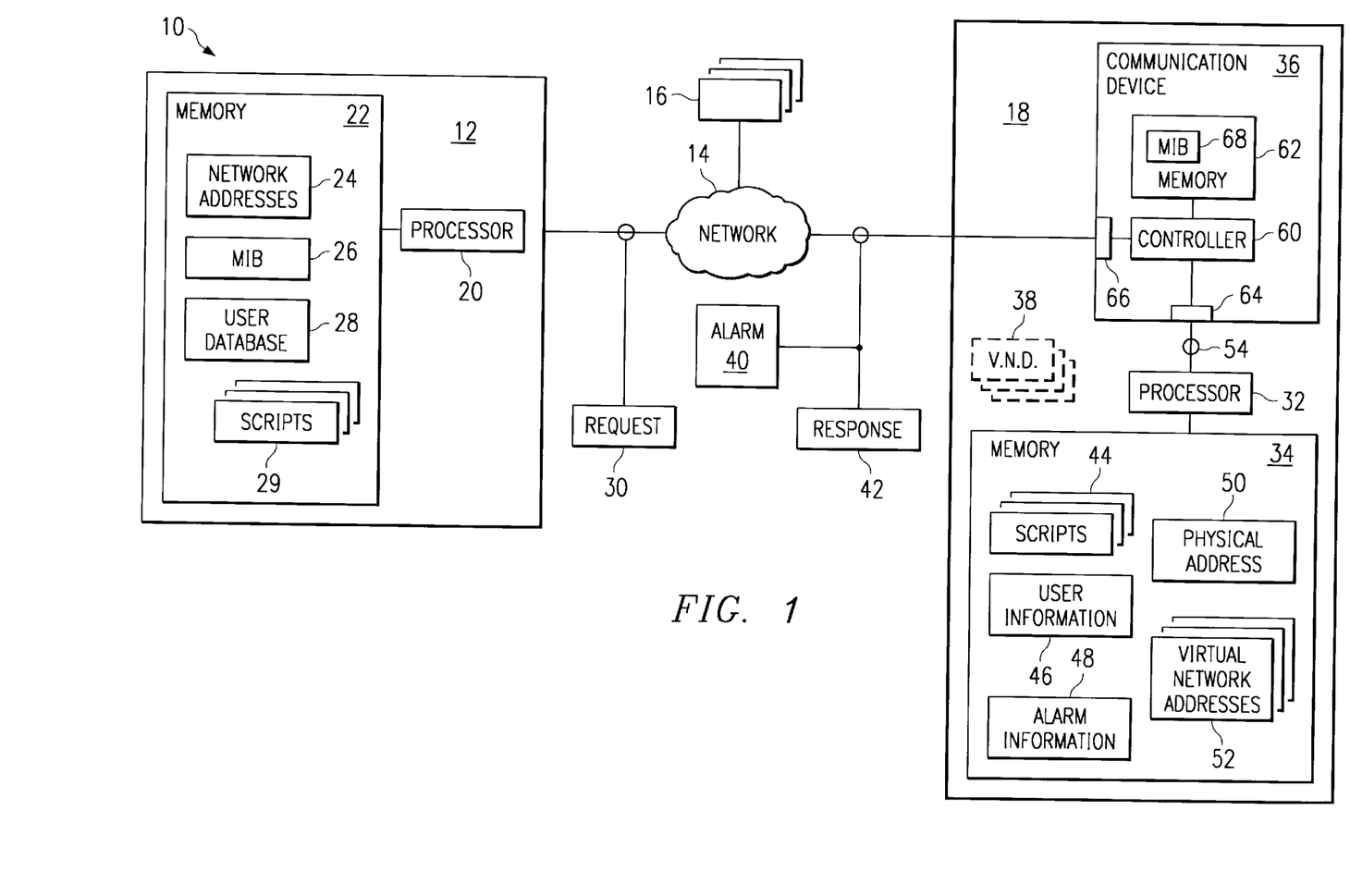
FIG. 1 is a block diagram illustrating a network management system.

FIG. 1 illustrates a network management system 10 that includes a network management server 12, a communication network 14, network devices 16, and a simulation device 18. In general, simulation device 18 simulates the operation of a number of network devices 16 to test the scaleability, performance, and reliability of network management server 12. The simulated network devices 16 are generally referred to as virtual network devices.

Network management server 12 comprises a processor 20 coupled to a memory 22. Processor 20 comprises a central processing unit associated with a computer system, such as a mainframe, a workstation, or any other suitable general purpose data processing facility which supports the functionality of server 12. Memory 22 comprises any suitable volatile or non-volatile memory device associated with processor 18. Memory 22 generally stores a number of files, lists, tables, or any other suitable arrangement of information that supports the functionality of network management server 12, such as network addresses 24, a management information base (MIB) 26, a user database 28, and scripts 29.

A computer network generally involves both network devices 16 and human users that use the network devices 16. Server 12 manages and controls various network devices 16 coupled to network 14, such as, for example, routers, bridges, gateways, hubs, switches, servers, Internet Protocol (IP) telephones, access control devices, and any other suitable devices that may be coupled to network 14. Server 12 also manages information associated with the users of network devices 16. For example, server 12 generally polls network devices 16 using requests 30 in order to retrieve and update information about network devices 16 and the users that use network devices 16, such as the information stored in MIB 26 and user database 28.

Each network address 24 is associated with a network device 16 managed by network management server 12. Network addresses 24 may be network layer addresses, path control addresses, or any other suitable network addresses that identify physical and/or virtual network devices within system 10. Although the following description is detailed with reference to Internet Protocol (IP) addresses, it should be understood that the present invention supports any suitable addressing protocol.

MIB 26 comprises any suitable arrangement of information associated with the network devices 16 managed by network management server 12. In one embodiment, the information stored in MIB 26 is arranged using Simple Network Management Protocol (SNMP) variables. Network management server 12 consults MIB 26 for various information about network devices 16 that network management server 12 manages so that, for example, the information may be used to monitor the condition of various components in system 10.

User database 28 comprises any suitable arrangement of information associated with the users of network devices 16. User database 28 generally allows a network administrator to manage profiles for the users of network devices 16. For example, user database 28 may store a user's name, password, list of subscribed services, connection type (e.g., DSL, analog, LAN and leased-line), status (e.g., log-in status, billing status, and operation), and other user information. The information in user database 28 may be edited to add and/or delete users, for example, or to otherwise modify a user's profile.

Scripts 29 comprise an arrangement or sequence of network addresses 24 and identifiers of information to be retrieved from network devices 16, such as, for example, information stored in MIB 26 or user database 28. Processor 20 executes scripts 29 to generate requests 30 for communication to network devices 16. Scripts 29 may direct processor 20 to generate and communicate requests 30 upon the lapse of a predetermined period of time or upon the occurrence of any other suitable trigger associated with server 12.

Communication network 14 comprises any combination of local area networks (LANs), medium and metropolitan area networks (MANs), wide area networks (WANs), global computer networks, hubs, routers, bridges, gateways, switches, servers, databases, or any other association of suitable wireline or wireless communication devices and networks. Network 14 may also comprise related software that supports communication between network management server 12, network devices 16, and simulation device 18.

Simulation device 18 comprises a processor 32 coupled to a memory 34 and a communication device 36. In general, simulation device 18 simulates the operation of network devices 16 using one or more virtual network addresses. In this respect, simulation device 18 provides virtual network devices 38. Network management server 12 manages virtual network devices 38 as though devices 38 are physical network devices 16.

Processor 32 comprises a central processing unit associated with a computer system, such as a mainframe, a workstation, or any other suitable general purpose data processing facility that supports generating alarm signals 40 and/or responses 42. Memory 34 comprises any suitable volatile or non-volatile memory device associated with processor 32. Memory 34 generally stores a number of files, lists, tables, or any other arrangement of information that supports the operation of simulation device 18, such as scripts 44, user information 46, alarm information 48, a physical network address 50, virtual network addresses 52, and any other suitable information that supports generating alarm signals 40 and/or responses 42.

Alarm signals 40 comprises communications indicating that an alarm event has occurred at a network device 16. In this respect, alarm signals 40 may be associated with an originating network device 16 using an appropriate network address 24. Simulation device 18 simulates the operation of network devices 16 by communicating to network management server 12 alarm signals 40 associated with virtual network devices 38. In particular, a portion of the alarm signals 40 generated by simulation device 18 may be associated with one or more virtual network devices 38 using one or more appropriate virtual network addresses 52.

Responses 42 generally include information requested by server 12 in one or more requests 30. In this request, responses 42 may also be associated with an originating network device 16 using an appropriate network address 24. Simulation device 18 simulates the operation of network devices 16 by generating and communicating responses 42 associated with virtual network devices 38. Each response 42 is associated with a virtual network device 38 using an appropriate virtual network address 52.

Scripts 44 comprise any predetermined arrangement or sequence of alarm information 48, virtual network addresses 52, and/or any other suitable information or commands that may be executed by processor 32 to simulate alarm events in simulation device 18. Processor 32 generally executes scripts 44 to generate control commands 54 for communication to communication device 36. In one embodiment, control commands 54 comprise command line interface commands associated with alarm information 48 and virtual network addresses 52. As will be described in greater detail below, communication device 36 responds to the alarm events simulated by control commands 54 by generating alarm signals 40 based on the information included within control commands 54. One embodiment of scripts 44 are described in greater detail with reference to FIG. 3.

User information 46 comprises information associated with human users of network devices 16, such as the users of simulation device 18. For example, user information 46 may comprise a user name and password, the software and hardware components used by the user to access simulation device 18, and any other suitable information associated with users of network devices 16, such as the information stored in user database 28.

Alarm information 48 comprises any suitable information that defines an alarm event associated with a network device 16. For example, alarm information 48 may comprise information defining temperature alarms, power failure alarms, interface alarms, or any other suitable alarm events that may occur in a network device 16. One embodiment of alarm information 48 is described in greater detail with reference to FIG. 2A.

Physical network address 50 comprises a network address that identifies simulation device 18 to other components of system 10. In one embodiment, physical network address 50 comprises the IP address of communication device 36 associated with simulation device 18. Each virtual network address 52 comprises a network address, such as an IP address, that identifies a virtual network device 38 to other components of system 10. Each virtual network address 52 is distinct from physical network address 50. In this respect, a physical network address 50 identifies a physical network device, such as communication device 36, to other components in system 10, and a virtual network address 52 identifies a virtual network device 38 to other components in system 10.

Communication device 36 comprises a controller 60 coupled to a memory 62, a first interface 64, and a second interface 66. The components of communication device 36 may be arranged integral to a router, bridge, gateway, hub, switch, server, IP telephone, access control device, or any other type of network device 16. In this respect, communication device 36 communicates with network 14 on behalf of simulation device 18.

Controller 60 comprises any suitable combination of hardware and software components that manage the overall operation of communication device 36. For example, controller 60 receives control commands 54, generates and communicates alarm signals 40 and responses 42 to network management server 12, and otherwise performs the operations of a network device 16.

Memory 62 comprises any suitable volatile or non-volatile memory device associated with controller 60. Memory 62 generally stores a number of files, lists, tables, or any other suitable arrangement of information that supports the operation of communication device 36, such a management information base (MIB) 68. It should be understood that memory 62 may also store the information stored in memory 34.

MIB 68 comprises any suitable arrangement of information associated with communication device 36 and/or virtual network devices 38. For example, MIB 68 includes information regarding the temperature of communication device 36, the number of users accessing communication device 36, the status of input/output interfaces associated with communication device 36, and any other information associated with communication device 36. The information stored in MIB 68 may also be associated with virtual network devices 38. In this respect, the status and/or condition of virtual network devices 38 mirror that of communication device 36. In one embodiment, the information stored in MIB 68 is arranged using SNMP variables.

Interfaces 64 and 66 comprise any suitable combination of hardware and software that communicate with processor 32 and communication network 14, respectively, on behalf of communication device 36. In one embodiment, interface 64 comprises a command line interface (CLI) that receives control commands 54 communicated by processor 32. Each control command 54 identifies one or more alarm events to be reported by simulation device 18. In one embodiment, interface 66 comprises one or more network line cards that couple communication device 36 to communication network 14.

In operation, system 10 generally performs two primary operations. In one aspect of operation, simulation device 18 simulates the operation of many network devices 16 by generating and communicating to server 12 one or more alarm signals 40 associated with virtual network addresses 52. In another aspect of operation, network management server 12 communicates one or more requests 30 to network devices 16 using network addresses 24. In one embodiment, a network address 24 to which a request 30 is communicated corresponds to physical network address 50 associated with simulation device 18. In another embodiment, a portion of the network addresses 24 to which requests 30 are communicated correspond to virtual network addresses 52. Simulation device 18 simulates the operation of network devices 16 by generating and communicating to server 12 one or more responses 42 associated with virtual network addresses 52. Network management server 12 performs its management operations in system 10 by receiving and processing alarm signals 40 and responses 42. The scaleability, performance, and reliability of server 12 may therefore be determined based upon the operation of server 12 with respect to signals 40 and responses 42 associated with virtual network addresses 52.

Technical advantages of the present invention include a system 10 in which a simulation device 18 simulates the operation of many network devices 16 by generating and communicating alarm signals 40 and responses 42 associated with virtual network devices 38 using virtual network addresses 52. In this respect, the present invention alleviates the burdens of maintaining many actual network devices 16 in system 10 while still accurately testing the scaleability, performance, and reliability of network management server 12.

As a part of its management operations, network management server 12 polls network devices 16 in system 10 using requests 30 to retrieve various information regarding the status of the network device 16 and/or the users of the network device 16. Processor 20 of server 12 may generate requests 30 based upon the execution of scripts 29. A request 30 may comprise a request for user information 42, information stored in MIB 68, or any other suitable information associated with network devices 16. To poll a particular network device 16, server 12 communicates a request 30 to a particular network address 24. In one embodiment, a network address 24 corresponds to physical network address 50 associated with simulation device 18. In another embodiment, one or more network addresses 24 correspond to virtual network addresses 52 stored in memory 34 of simulation device 18. Communication device 36 of simulation device 18 is configured to receive messages from communication network 14, such as requests 30 generated by server 12, directed to network addresses 24 corresponding to physical network address 50 and virtual network addresses 52.

Network management server 12 generally distinguishes each network device 16 of system 10 by its associated network address 24. Server 12 may therefore discard multiple responses 42 associated with a single network address 24, such as physical network address 50. In order to test the capacity of server 12, simulation device 18 simulates the operation of multiple network devices 16 in system 10. In particular, simulation device 18 generates multiple responses 42 using multiple virtual network addresses 52 that are distinct from physical network address 50 of simulation device 18. For example, simulation device 18 generates responses 42 that may include user information 46, information stored in MIB 68, or any other suitable information associated with any component of simulation device 18. Each response 42 is associated with a virtual network address 52. Therefore, simulation device 18 provides many responses 42 to a single request 30 using virtual network addresses 52. Server 12 processes responses 42 associated with virtual network addresses 52 as though they originated from multiple physical network devices 16.

Server 12 may also generate a request 30 directed to the physical network address 50 of simulation device 18. Simulation device 18 generates and communicates to server 12 a response 42 associated with physical network address 50. Therefore, a simulation device 18 may generate and communicate to server 12 one or more responses 42 associated with virtual network addresses 52 and a response 42 associated with a physical network address 50.

The other aspect of network management server 12 that is tested by network management system 10 is the ability of network management server 12 to handle large numbers of alarm signals 40. Network devices 16 experience various events which are monitored by network management server 12. Examples of these events, generally referred to as alarm events, include power failures at the network device 16, extreme temperature or processor load fluctuations at the network device 16, or any other event associated with the operation of a network device 16. Alarm signals 40 generally indicate the alarm events and the source of the alarm events to the network management server 12.

A network management server 12 is generally designed to discard duplicate alarm signals 40 originating from a single network device 16. Thus, if simulation device 18 communicates duplicate alarm signals 40 associated with physical network address 50, server 12 processes only the first alarm signal 40 received from simulation device 18 and discards further duplicate alarm signals 40 associated with physical network address 50. Simulation device 18 supports testing whether network management server 12 is capable of handling large numbers of alarm signals 40 by using virtual network addresses 52 to generate alarm signals 40. For example, simulation device 18 generates multiple alarm signals 40 associated with multiple virtual network addresses 52 in order to test the capacity of server 12. In this respect, simulation device 18 generates multiple alarm signals 40 that indicate the occurrence of alarm events at multiple virtual devices 38. Simulation device 18 may also generate an alarm signal 40 using a physical network address 50. In this respect, simulation device 16 may generate an alarm signal 40 that indicates the occurrence of an alarm event at communication device 36. Simulation device 18 communicates alarm signals 40 to server 12 to test the capacity of server 12. By processing a large number of alarm signals 40, network management server 12 is tested for performance, scaleability, and reliability in large network environments. Simulation device 18 therefore overcomes the problem of server 12 discarding duplicate alarm signals 40 originating from the same network device 16.

Simulation device 18 generates alarm signals 40 by associating alarm information 48 with physical network address 50 and/or virtual network addresses 52. In one embodiment, controller 60 generates alarm signals 40 by forming one or more appropriately formatted packets of information for transmission to network management server 12. The packets of information may comprise data packets for use over a packet-switched network, data streams for use over circuit-switched networks, or any other suitable formatting of data for transmission over network 14. In another embodiment, processor 32 may generate alarm signals 40 for communication to server 12. In this embodiment, processor 32 forms one or more appropriately formatted packets of information that may include alarm information 48 associated with a physical network address 50 and/or virtual network addresses 52.

Controller 60 generates alarm signals 40 in response to a control command 54 provided to communication device 36. In one embodiment, each control command 54 is a CLI command provided to interface 64 of communication device 36. Control commands 54 include alarm information 48 and may also include virtual network addresses 52. When control commands 54 comprise only alarm information 48, controller 60 generates one or more distinct alarm signals 40 using the provided alarm information 48 associated with one or more virtual network addresses 52. Controller 60 may select particular virtual network addresses 52 randomly, according to a predetermined sequence, or according to any other suitable selection process. A control command 54 may also explicitly associate alarm information 48 with one or more particular virtual network addresses 52. When control command 54 explicitly associates alarm information 48 with one or more virtual network addresses 52, controller 60 generates alarm signals 40 using the provided alarm information 48 and the provided virtual network addresses 52. Controller 60 is operable to accept either version of control command 54 and, in response, generate one or more appropriate alarm signals 40.

In one embodiment, a user of simulation device 18 may manually provide control commands 54 to communication device 36 by entering commands 54 at a CLI provided by interface 64. In another embodiment, processor 32 may automatically provide control commands 54 to communication device 36 by executing a script 44.

Multiple simulation devices 18 may be used to simulate very large numbers of network devices 16 in system 10. Each simulation device 18 may simulate the operation of a different group of network devices 16. Thus, each simulation device 18 is configured to use a distinct set of virtual network addresses 52. One advantage to using multiple simulation devices 18 is that different types of network devices 16 may be simulated. For example, one simulation device 18 may simulate a first type of network device 16, such as a router, while another simulation device 18 may simulate a second type of network device 16, such as a bridge. Each simulation device 18 may also simulate the simultaneous operation of many network devices 16. For example, a first simulation device 18 and a second simulation device 18 may simultaneously simulate the operation of many network devices 16. Any suitable combination of network devices 16 may be simulated by a proper arrangement of simulation devices 18.

Figure 2A:
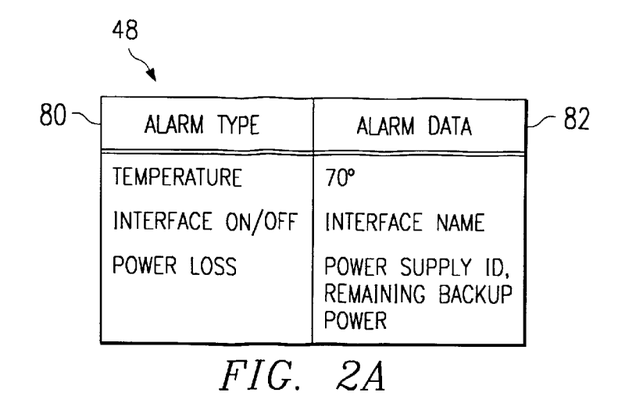
FIG. 2A is one embodiment of alarm information used by a simulation device of the system.

FIG. 2A illustrates one embodiment of alarm information 48 used by simulation device 18 to generate alarm signals 40 associated with virtual network devices 38. Alarm information 48 may be provided to communication device 36 manually by a user of device 36 or automatically by processor 32 executing a script 44. Alarm information 48 details an alarm type 80 and alarm data 82 for a simulated alarm event to be reported to server 12 using alarm signals 40.

Alarm type 80 represents the general class and type of an alarm event and is associated with alarm data 82 which provides more detailed information about the alarm event. For example, alarm type 80 may indicate a temperature alarm event, an interface on/off alarm event, a power loss alarm event, or any other suitable alarm event that may occur at a network device 16. Alarm data 82 associated with the temperature alarm event may comprise an actual temperature that would cause the temperature alarm event. Alarm data 82 associated with the interface on/off alarm event may comprise a name or other identifier indicating a particular interface that may be activated and/or deactivated to cause the interface on/off alarm event. Alarm data 82 associated with the power loss alarm event may comprise an identifier associated with a particular power supply that may lose power and an indication of any remaining backup power associated with that power supply. Any other suitable combination of alarm type 80 and alarm data 82 may be used depending on particular features and functions associated with a particular network device 16. Controller 60 uses alarm information 48 to generate one or more alarm signals 40. In one embodiment, controller 60 includes in an alarm signal 40 the alarm type 80 identifying a particular alarm event and alarm data 82 detailing the alarm event.

Figure 2B:
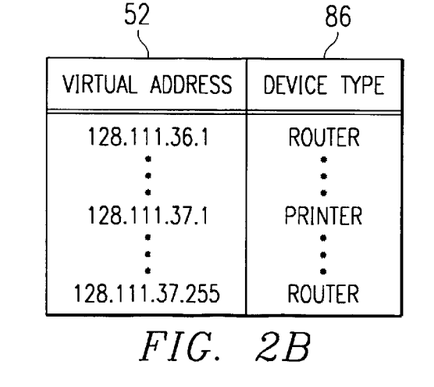
FIG. 2B illustrates one embodiment of virtual network addresses used by the simulation device.

FIG. 2B illustrates one embodiment of virtual network addresses 52 used by simulation device 18 to generate alarm signals 40 and responses 42. In one embodiment, each virtual network address 52 is an IP address. Virtual network addresses 52 may be associated with a device type 86 indicating the type of network device 16 each virtual network address 52 represents. A simulation device 18 may use device types 86 to provide different characteristics to virtual network devices 38. For example, a simulation device 18 may generate appropriate alarm signals 40 and responses 42 based upon the particular type of virtual network device 38 that is the source of an alarm signal 40 and upon the particular type of virtual network device 38 network management server 12 is polling.

Figure 2C:
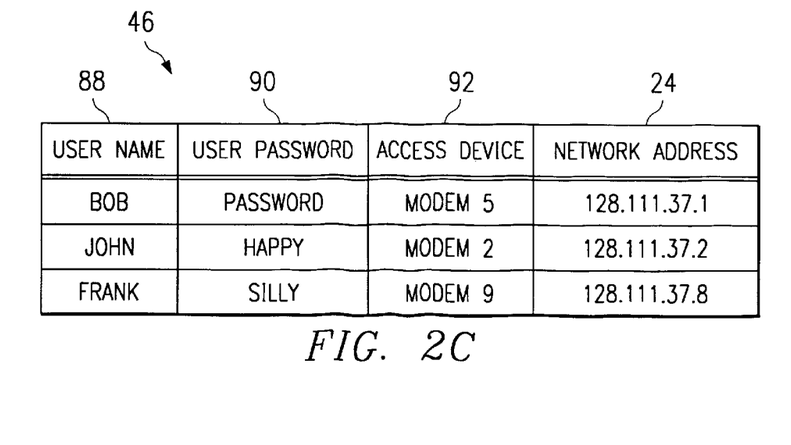
FIG. 2C illustrates one embodiment of user information used by the simulation device.

FIG. 2C illustrates one embodiment of user information 46 used by simulation device 18. User information 46 comprises information about the human users that access network devices 16, such as, for example, a user name 88, user password 90, an access device 92, the network address 24 of the network device 16 that the user is accessing, or any other suitable information about the users of network devices 16 in system 10. For example, user "Bob" may have an associated password of "password", and be currently connected to "modem 5" in order to access a network device 16 with a network address 24 of "128.111.37.1". User database 28 may store user information 46 so that server 12 can manage the operation of users in system 10. Server 12 may request user information 46 associated with one or more particular network devices 16 using requests 30. Simulation device 18 simulates the operation of many network devices 16 by constructing responses 42 that include the requested user information 46 and virtual network addresses 52 associated with multiple virtual network devices 38. Server 12 populates user database 28 with user information 46 communicated by responses 42 as though responses 42 were originated by network devices 16.

Figure 3:
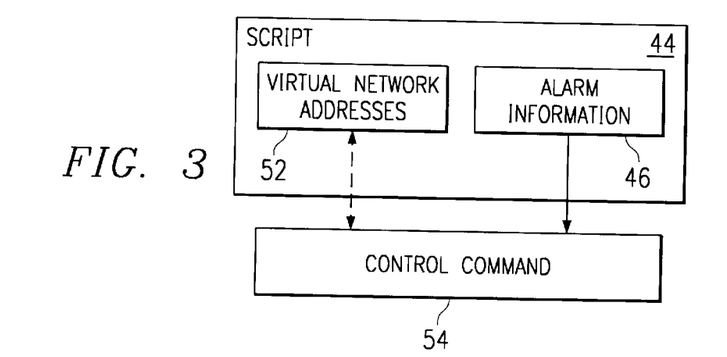
FIG. 3 illustrates one embodiment of a script used by the simulation device.

FIG. 3 illustrates one embodiment of a script 44 used by simulation device 18. A script 44 comprises an arrangement of alarm information 48 and/or virtual network addresses 52. Processor 32 executes scripts 44 to generate control commands 54 for communication to communication device 36. Each control command 54 comprises a command used by controller 60 to cause the generation of one or more alarm signals 40. Control commands 54 may include alarm information 48 and virtual network addresses 52 formatted such that controller 60 may process commands 54 to generate alarm signals 40. For example, control commands 54 may include only alarm information 48 without an explicit association with virtual network addresses 52. In this embodiment, controller 60 generates the appropriate alarm signals 40 associated with any suitable selection of virtual network addresses 52. In another example, control commands 54 include alarm information 48 explicitly associated with one or more virtual network addresses 52. In this embodiment, controller 60 generates the appropriate alarm signals 40 associated with the virtual network addresses 52 communicated in control commands 54.

Figure 4:
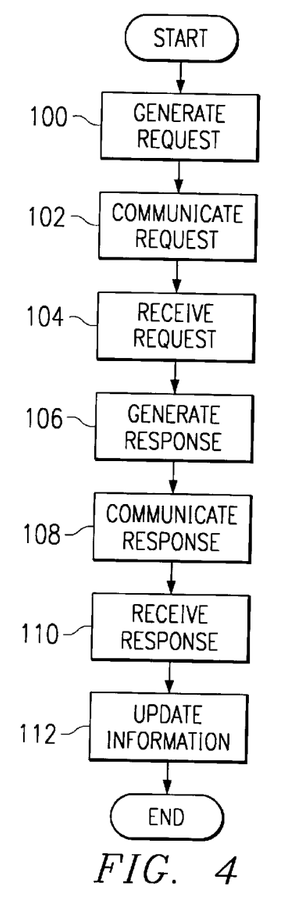
FIG. 4 is an exemplary method of polling in the system.

FIG. 4 is an exemplary method of polling in system 10. The method begins at step 100 where network management server 12 generates a request 30 for information, such as user information 46, information stored in a MIB 68, or any other suitable information associated with a network device 16. Server 12 communicates request 30 to a network device 16 using a network address 24 at step 102. In one embodiment, network address 24 used to direct request 30 to a network device 16 corresponds to physical network address 50 of simulation device 18. Server 12 may perform steps 100 and 102 in response to the lapse of a predetermined period of time or upon the occurrence of any other suitable trigger in system 10.

Simulation device 18 receives request 30 at step 104. Simulation device 18 simulates the operation of network devices 16 by using virtual network addresses 52. In particular, simulation device 18 generates one or more appropriate responses 42 to request 30 at step 106 using the requested information and one or more appropriate virtual network address 52. For example, if request 30 requested the processor load of communication device 36, responses 42 include the requested processor load associated with one or more virtual network devices 38 and one or more appropriate virtual network addresses 52. Simulation device 18 communicates responses 42 to server 12 at step 108 using network 14.

Network management server 12 receives responses 42 at step 110 and updates MIB 26 and/or user database 28 at step 112. Steps 100–112 are repeated in system 10 for multiple network addresses 24. In this respect, simulation device 18 uses virtual network addresses 52 to simulate the operation of multiple network devices 16 in system 10. By receiving a request 30 directed to a particular network device 16 and generating multiple responses 42 using virtual network addresses 52, simulation device 18 may simulate a large network environment to test the scaleability, performance, and reliability of server 12.

Figure 5:
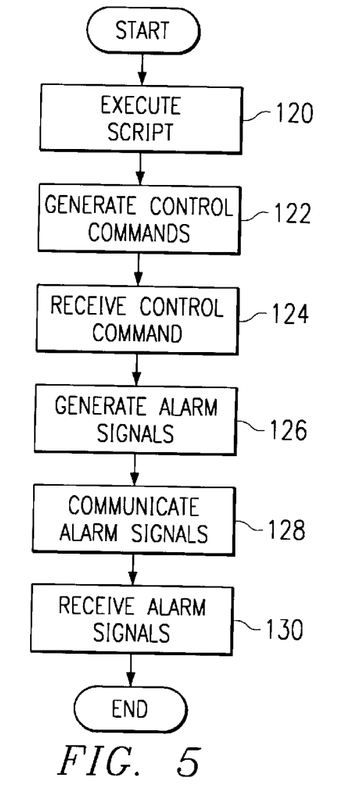
FIG. 5 is an exemplary method of generating alarm signals in the system.

FIG. 5 is an exemplary method of generating alarm signals 40 in system 10. The method begins at step 120 where processor 32 executes a script 44 having an arrangement of alarm information 48 and/or virtual network addresses 52. In response, processor 32 generates control commands 54 at step 122 for communication to communication device 36. Communication device 36 receives one or more control commands 54 at step 124. As an alternative to providing control commands 54 automatically to communication device 36 using a processor 32 executing a script 44, control commands 54 may be manually entered at interface 64 by a user. Control commands 54 may include alarm information 48 and/or virtual network addresses 52. Controller 60 generates one or more appropriate alarm signals 40 at step 126 according to the alarm information 48 provided in control commands 54.

Each alarm signal 40 is associated with an appropriate virtual network address 52, such as a virtual network address 52 associated with alarm information 48 in command 54. Communication device 36 communicates alarm signals 40 to server 12 at step 128 using communication network 14. Proceeding to step 130, network management server 12 receives and processes alarm signals 40 as though they were originated by many different network devices 16. Steps 120–130 may be performed in system 10 using multiple simulation devices 18 simultaneously. Simulation device 18 therefore uses virtual network addresses 52 to simulate the generation of alarm signals 40 from multiple network devices 16 in system 10. In this respect, the simulation device 18 decreases the monetary and time burdens of purchasing and maintaining many network devices 16 in system 10 while still accurately testing the scaleability, performance, and reliability of network management server 12.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A network management system, comprising:
    a network management server coupled to a communication network; and
    a simulation device coupled to the communication network, the simulation device having a physical network address and operable to communicate an alarm signal to the network management server using a communication connection established between the network management server and the physical network address, wherein the alarm signal is associated with a virtual network address that is distinct from the physical network address and the physical and virtual network addresses are both on a single network layer.

2. The system of claim 1, wherein the simulation device comprises:
    a memory operable to store alarm information arranged in a script;
    a processor coupled to the memory and operable to execute the script to initiate generating the alarm signal; and
    a communication device coupled to the processor and operable to communicate the alarm signal.

3. The system of claim 2, wherein:
    the memory stores the physical network address and a plurality of virtual network addresses; and
    the communication device comprises a controller operable to generate the alarm signal.

4. The system of claim 2, wherein:
    the script includes a plurality of control commands associated with the alarm information; and
    the communication device generates the alarm signal in response to the processor executing the script.

5. The system of claim 2, wherein:
    the memory is further operable to store a plurality of virtual network addresses; and
    the processor is further operable to generate the alarm signal using the alarm information and the virtual network addresses.

6. The system of claim 1, wherein the alarm signal comprises a first alarm signal and the simulation device is further operable to generate a second alarm signal, the second alarm signal associated with the physical network address.

7. The system of claim 1, wherein the simulation device comprises a first simulation device, and further comprising a second simulation device coupled to the communication network, wherein the first simulation device is operable to generate alarm signals using a first group of virtual network addresses and the second simulation device is operable to generate alarm signals using a second group of virtual network addresses.

8. The system of claim 1, wherein the network management server comprises:
    a memory operable to store a plurality of network addresses; and
    a processor coupled to the memory and operable to communicate to the simulation device a request associated with a network address corresponding to the physical network address of the simulation device.

9. The system of claim 8, wherein the simulation device comprises a controller operable to generate a first response and a second response in response to receiving the request at the simulation device, the first response associated with the physical network address and the second response associated with a virtual network address that is distinct from the physical network address.

10. A method for communicating alarm signals, comprising:
    storing a physical network address associated with a simulation device;
    storing a plurality of virtual network addresses; and
    communicating an alarm signal to a network management server using a communication connection established between the network management server and the physical network address, the alarm signal associated with a virtual network address that is distinct from the physical network address, wherein the physical and virtual network addresses are both on a single network layer.

11. The method of claim 10, further comprising:
    storing alarm information arranged in a script;
    executing the script; and
    generating the alarm signal in response to executing the script.

12. The method of claim 11, wherein the script includes a plurality of control commands associated with the alarm information, and further comprising:
    executing the control commands; and
    generating the alarm signal in response to executing the control commands.

13. The method of claim 10, wherein the alarm signal comprises a first alarm signal and further comprising communicating a second alarm signal, the second alarm signal associated with the physical network address.

14. The method of claim 10, further comprising:
    receiving a request associated with a network address corresponding to the physical network address of the simulation device; and
    in response to the request, generating a first response to the request associated with the physical network address; and
    in response to the request, generating a second response to the request associated with a virtual network address that is distinct from the physical network address.

15. A simulation device, comprising:
    a memory operable to store a physical network address associated with the simulation device and a plurality of virtual network addresses; and
    a controller operable to communicate to a network management server a first alarm signal associated with the physical network address and a second alarm signal associated with a particular virtual network address, wherein the first and second alarm signals are communicated using a communication connection established between the network management server and the physical network address, the particular virtual network address is distinct from the physical network address, and the physical and virtual network addresses are both on a single network layer.

16. The simulation device of claim 15, wherein the controller and the memory are formed integral to a communication device and the controller generates the alarm signals.

17. The simulation device of claim 15, wherein the memory stores alarm information arranged in a script, and further comprising a processor coupled to the memory and operable to execute the script to initiate generating the alarm signals.

18. The simulation device of claim 17, wherein:
the script includes a plurality of control commands associated with the alarm information; and
the controller generates the alarm signal in response to the processor executing the script.

19. The simulation device of claim 17, wherein the processor is further operable to generate the alarm signals using the alarm information and the virtual network addresses.

20. The simulation device of claim 15, wherein the controller is further operable to:
receive a request associated with a network address corresponding to the physical network address of the simulation device;
generate a first response to the request associated with the physical network address in response to the request; and
generate a second response to the request associated with a virtual network address that is distinct from the physical network address in response to the request.

21. A method for communicating network messages in response to a request, comprising:
receiving, at a simulation device having a physical network address, a request from a network management server;
in response to the request, generating a plurality of responses, wherein at least one of the responses is associated with a virtual network address distinct from the physical network address and the physical and virtual network addresses are both on a single network layer; and
communicating the responses to the network management server using a communication connection between the network management server and the physical network address of the simulation device.

22. The method of claim 21, further comprising:
storing response information in a plurality of scripts;
executing the plurality of scripts in response to receiving the request; and
generating the plurality of responses in response to executing the scripts.

23. The method of claim 22, wherein each script comprises a sequence comprising a plurality of control commands, and executing each script comprises executing the sequence of control commands.

24. Software embodied in a computer readable medium operable to perform the steps of:
storing a physical network address associated with a simulation device;
storing a plurality of virtual network addresses; and
communicating an alarm signal to a network management server using a communication connection established between the network management server and the physical network address, the alarm signal associated with a virtual network address that is distinct from the physical network address, wherein the physical and virtual network addresses are both on a single network layer.

25. The software of claim 24, further operable to perform the steps of:
storing alarm information arranged in a script;
executing the script; and
generating the alarm signal in response to executing the script.

26. The software of claim 25, wherein the script includes a plurality of control commands associated with the alarm information, and further comprising:
executing the control commands; and
generating the alarm signal in response to executing the control commands.

27. The software of claim 24, further operable to perform the steps of:
receiving a request associated with a network address corresponding to the physical network address of the simulation device; and
generating a first response to the request associated with the physical network address in response to the request; and
generating a second response to the request associated with a virtual network address that is distinct from the physical network address in response to the request.

28. A system, comprising:
means for storing a physical network address associated with a simulation device;
means for storing a plurality of virtual network addresses; and
means for communicating an alarm signal to a network management server using a communication connection established between the network management server and the physical network address, the alarm signal associated with a virtual network address that is distinct from the physical network address, wherein the physical and virtual network addresses are both on a single network layer.

29. The system of claim 28, further comprising:
means for storing alarm information arranged in a script;
means for executing the script; and
means for generating the alarm signal in response to executing the script.

30. The system of claim 29, further comprising:
means for executing the control commands; and
means for generating the alarm signal in response to executing the control commands.

31. The system of claim 28, further comprising:
means for receiving a request associated with a network address corresponding to the physical network address of the simulation device; and
means for generating a first response to the request associated with the physical network address in response to the request; and
means for generating a second response to the request associated with a virtual network address that is distinct from the physical network address in response to the request.

* * * * *